United States Patent [19]

Moglia

[11] Patent Number: 4,819,979
[45] Date of Patent: Apr. 11, 1989

[54] GOLF CART WINDSHIELD

[76] Inventor: John A. Moglia, 128 N. Marshall St., Allentown, Pa. 18104

[21] Appl. No.: 129,523

[22] Filed: Dec. 7, 1987

[51] Int. Cl.$^4$ ............................................. B60J 1/02
[52] U.S. Cl. .................................................. 296/77.1
[58] Field of Search ................. 296/78 R, 78 A, 78.1, 296/84 R, 102; 280/DIG. 5

[56] References Cited

U.S. PATENT DOCUMENTS

| 3,829,152 | 8/1974 | Hobbs | 296/78 R |
| 4,014,589 | 3/1977 | Yerkey | 296/78 R |
| 4,098,536 | 7/1978 | Mills | 296/78 R |
| 7,621,859 | 11/1986 | Spicher | 296/78 R |

Primary Examiner—Robert R. Song
Attorney, Agent, or Firm—Fleit, Jacobson, Cohn & Price

[57] ABSTRACT

A flexible panel assembly of strong weather and abrasion resistant material is provided for overlying the front side of and removable attachment to an inverted U-shaped frame supported and projecting upwardly from the forward transverse cowl portion of a golf cart utilized to support the forward marginal edge of a top disposed over the operator and passenger positions of the cart. The upper central portion of the panel assembly includes a flexible, transparent insert of optically clear material through which forward vision of the operator of the cart may be had, the lower marginal portion of the panel assembly at least slightly edgewise overlapping the upper marginal edge of the transverse cowl portion of the cart.

8 Claims, 2 Drawing Sheets

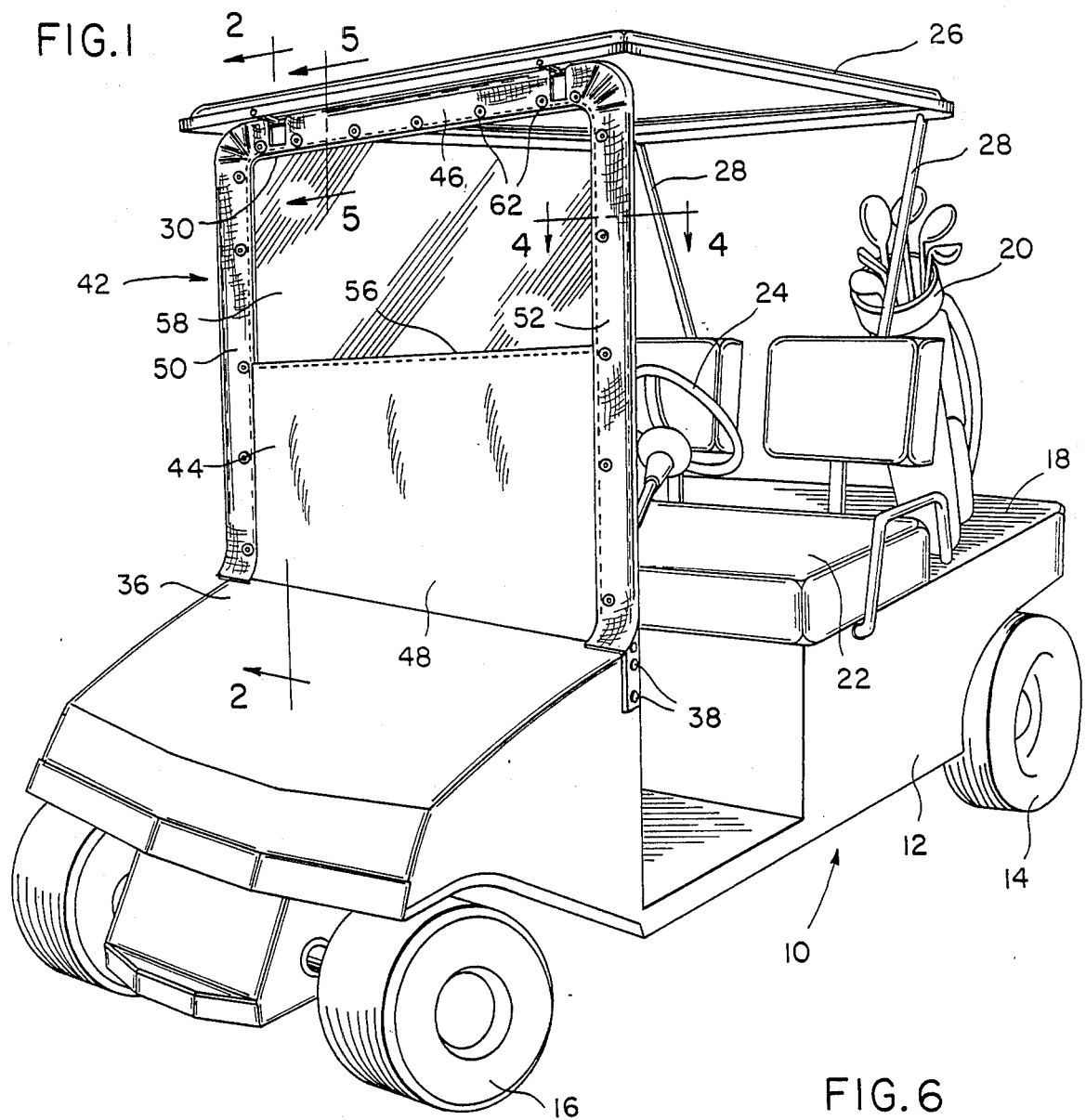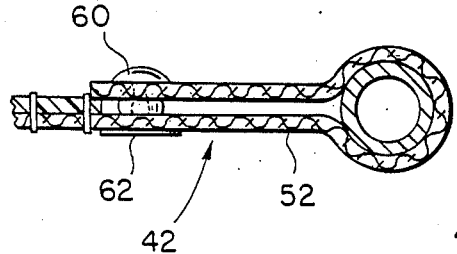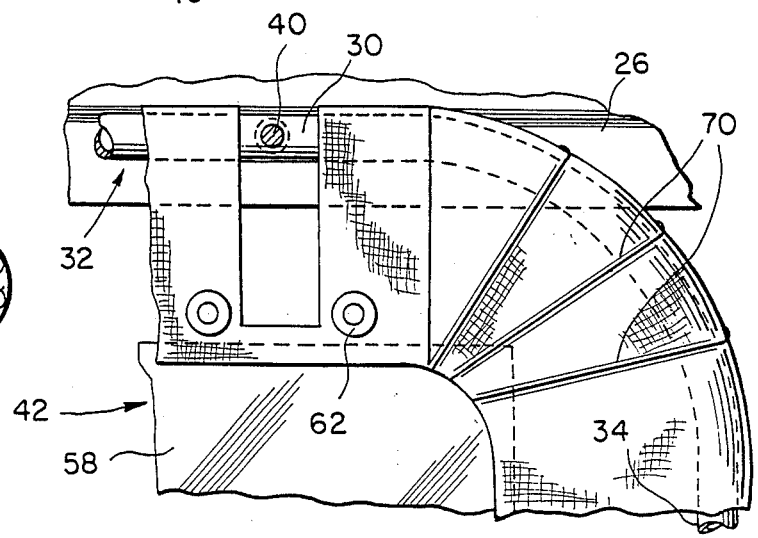

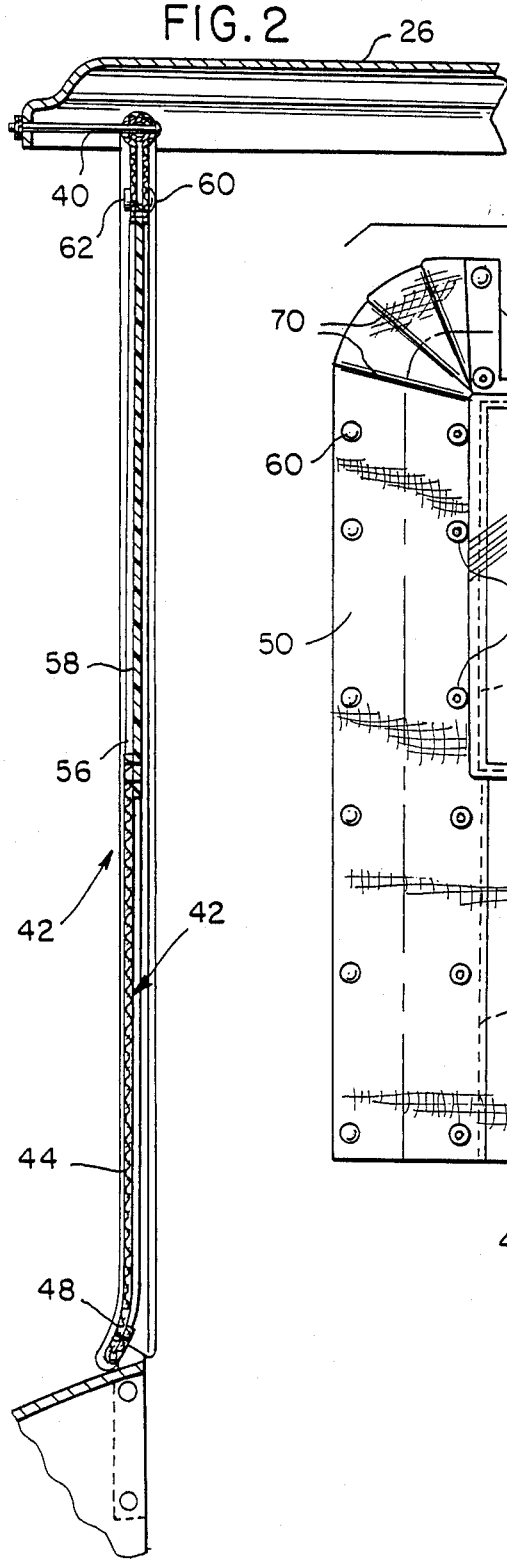
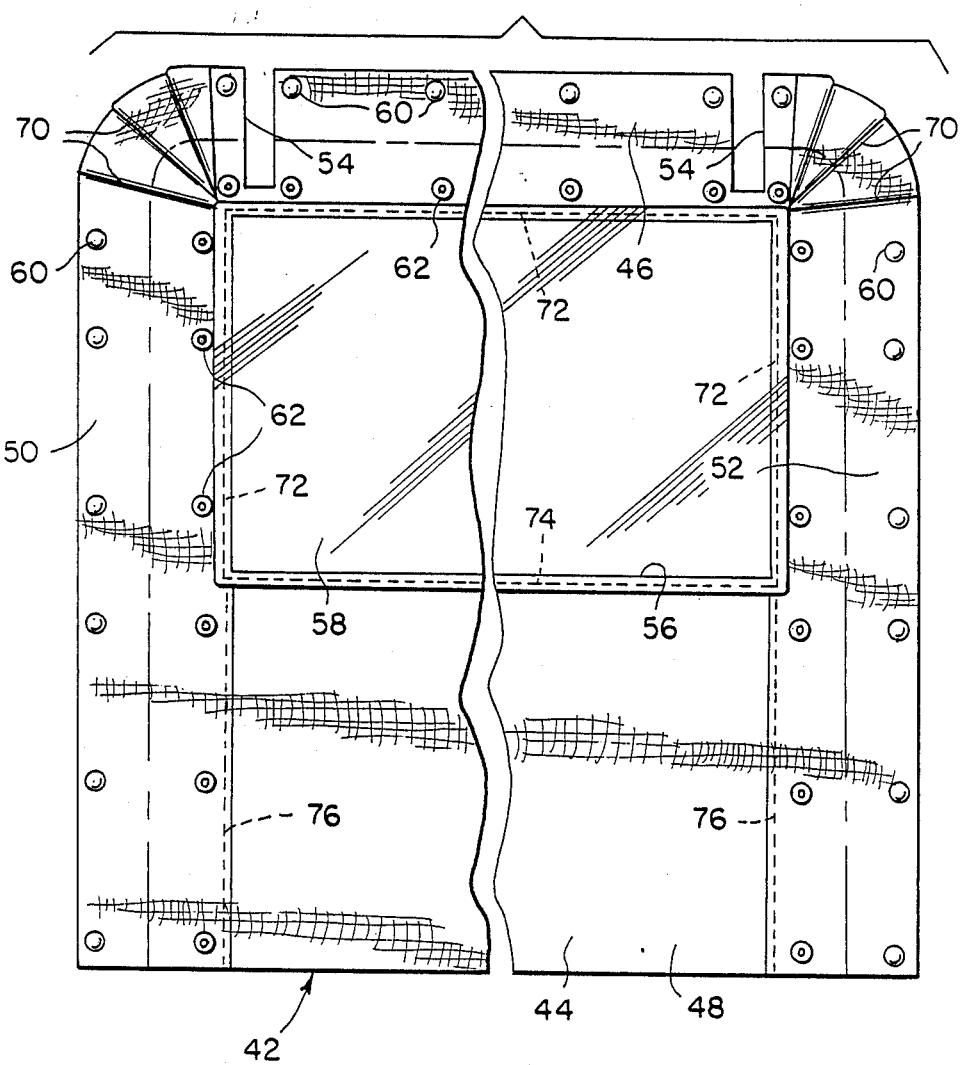
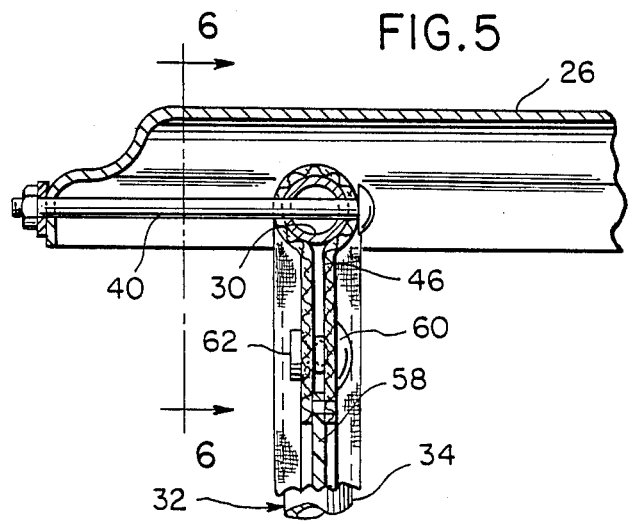

GOLF CART WINDSHIELD

BACKGROUND OF THE INVENTION

1. FIELD OF THE INVENTION

This invention relates to a flexible combined windbreak and windshield panel for ready-removable support from the forward inverted U-shaped top support frame of a golf cart, wherein support structures spaced along the bight portion of the U-shaped frame support the forward marginal edge of the golf cart top from the U-shaped frame bight portion in spaced relation relative thereto. The flexible panel may be readily removed and rolled into a compact state for storage in a suitable location on the associated golf cart.

2. DESCRIPTION OF RELATED ART

Various different windshield assemblies, top structures, and weather enclosures heretofore have been provided for use in conjunction with golf cart type vehicles. Examples of these different structures are disclosed in U.S. Pat. Nos. 3,829,152; 3,958,826; 4,013,315; 4,014,589; 4,098,536; 4,332,415; and 4,488,750. However, these previously known structures do not include the overall structural and operational features of the instant invention which are particularly well adapted to be utilized with a given type of golf cart forward top supporting frame.

SUMMARY OF THE INVENTION

The windshield of the instant invention incorporates a flexible panel including upper and opposite side marginal edges for folding over and securement about the upper bight portion and opposite side legs of an inverted U-shaped frame provided on some forms of golf carts for supporting the forward marginal edge of a golf cart top. The panel includes a flexible panel-like transparent insert spaced inward of the opposite side marginal edges of the panel and below the upper marginal edge thereof, and the lower marginal edge of the panel overlaps the upper marginal edge of a forward cowl portion of the associated golf cart to whose opposite ends the lower ends of the legs of the inverted U-shaped top support frame are anchored.

The main object of this invention is to provide a forward windbreak and windshield panel for a golf cart provided with a forward inverted U-shaped top-supporting frame and with the panel constructed in a manner such that it may be removed from a suitable storage location and quickly applied to the forward inverted U-shaped top support frame of an associated golf cart.

Another object of this invention is to provide a combined windbreak and windshield invention in accordance with the preceding object and including structural features thereof which will afford a long operating life of the windshield panel.

Another important object of this invention is to provide a combined windbreak and windshield panel which may be readily adapted for use on golf carts of different manufacture.

A final object of this invention to be specifically enumerated herein is to provide a combined golf cart windbreak and windshield panel in accordance with the preceding objects and which will conform to conventional forms of manufacture, be of simple construction, and easy to use so as to provide a device that will be economically feasible, long-lasting, and relatively trouble-free in operation.

These, together with other objects and advantages which will become subsequently apparent, reside in the details of construction and operation, as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a convention form of golf cart having a combined windbreak and windshield panel constructed in accordance with the present invention operatively associated therewith;

FIG. 2 is an enlarged fragmentary vertical sectional view taken substantially upon the plane indicated by the section line 2—2 of FIG. 1;

FIG. 3 is a fragmentary plan view of the flexible windshield panel assembly;

FIG. 4 is an enlarged fragmentary horizontal sectional view taken substantially upon the plane indicated by the section line 4—4 of FIG. 1;

FIG. 5 is an enlarged fragmentary vertical sectional view taken substantially upon the plane indicated by the section line 5—5 of FIG. 1; and FIG. 6 is an enlarged fragmentary elevational view of the upper right-hand portion of the windshield panel assembly illustrated in FIG. 1 and with the attendant top support illustrated in vertical section.

DESCRIPTION OF THE PREFERRED EMBODIMENT

Referring now more specifically to the drawings, the numeral 10 generally designates a conventional form of golf cart including a body 12 from which rear driving wheels 14 are journalled, as well as front steerable wheels 16. The golf cart 10 includes a rear upwardly facing support surface 18 upon which golf bags may be supported and a seat 22 upon which the operator of the golf cart 10, as well as one or more passengers, may be seated. A steering wheel 24 is disposed forward of the seat 22 and a horizontal top 26 is disposed over the seat 22 and steering wheel 24 and supported at its rear corners by upstanding supports 28 and at its forward corners from the upper bight portion 30 of an inverted, generally U-shaped frame 32, incorporating a pair of upstanding opposite side legs 34 interconnected at their upper ends by the bight portion 30 and secured at their lower ends to opposite end portions of the transversely extending cowl 36 of the body 12, as at 38. The forward corners of the top 26 are supported from the opposite ends of the bight portion 30 through the utilization of elongated, horizontal, and front-to-rear extending support members 40 secured at their rear ends to the bight portion 30 an to opposite ends of the front margin of the top 26 at their forward ends.

The combined windbreak and windshield assembly of the instant invention is referred to in general by the reference numeral 42 and includes an upright, flexible panel 44, including upper and lower marginal edge portions 46 and 48 and upstanding opposite side marginal edge portions 50 and 52. The height of the panel 44 is greater than the effective height of the bight portion 30 above the cowl 36 and of a width greater than the distance between the legs 34. The upper marginal edge portion 46 has edgewise outwardly opening notches 54 formed therein and the upper half of the panel 44 includes an opening 56 formed therein in which a flexible transparent panel 58 is secured. The panel 58 may be constructed of plastic, and the panel 44 may be constructed of any suitable long-life and abrasion resistant material such as canvas.

The marginal edge portions 46, 50, and 52 are provided with a set of corresponding outer marginal snap fastener elements 60 spaced therealong and an additional set of inner marginal snap fastener elements 62 spaced therealong inwardly of the fastener elements 60. The fastener elements 60 and 62 may comprise coacting male and female fastener elements, and the outer portion of the upper marginal edge portion 46 is deflected rearwardly over and downwardly behind the bight portion 30 with the fastener elements 60 supported therefrom snap engaged with the corresponding fasteners 62, the notches 54 receiving the support members 40 therethrough. In addition, the outer portions of the marginal edge portions 50 and 52 are deflected rearwardly and inwardly behind the legs 34 and the elements 60 thereon are snap engaged with the corresponding fastener elements 62. In this manner, the combined windbreak and windshield assembly 42 is removably mounted upon the inverted U-shaped frame 32 and extends fully between the bight portion 30 and the upper marginal portion of the cowl 36. In actual practice, the lower marginal edge of the assembly 42 at least slightly overlaps the upper marginal edge of the cowl 36.

Of course, the assembly 42 may be readily disengaged from the frame 32 and stored in an appropriate location (such as beneath the seat 22) when the ambient temperature is warm and the weather is fair. However, in cooler weather and/or in the event of rain, the assembly 42 may be removed from its storage position and readily, removably secured to the frame 32 in a minimum of time.

In the interest of saving material, the marginal edge portions 46, 50, and 52 are formed from a single strip of material and pleated, as at 70, to conform to the smoothly merging curved ends of the bight portion 30 and legs 34, and the panel 44 is approximately the same size as the panel 58. In this manner, the opening 56 is not required to be formed by cutting a large portion of the panel 44 from the remainder thereof. Of course, the panel 58 is sewn to the marginal edge portions 46, 50, and 52, as at 72, and to the panel 44, as at 74, the panel 74 also being sewn to the marginal edge portions 50 and 52, as at 76.

The foregoing is considered as illustrative only of the principles of the invention. Further, since numerous modifications and changes will readily occur to those skilled in the art, it is not desired to limit the invention to the exact construction and operation shown and described; and, accordingly, all suitable modifications and equivalents may be resorted to, falling within the scope of the invention.

What is claimed as new is as follows:

1. In combination with a recreational vehicle of the type including a forward, upstanding, inverted, generally U-shaped top support frame incorporating a pair of upstanding opposite side legs interconnected at their upper ends by a horizontal bight portion extending therebetween and wherein the lower ends of said legs are anchored relative to opposite side body portions of said vehicle between which a front cowl portion of said body extends and the forward marginal edge of a top structure is supported from and in spaced relation relative to said bight portion through the utilization of support members extending between and secured to said forward marginal edge portion and said bight portion, a removable windbreak and windshield assembly, said assembly including an upright flexible panel having upper and lower marginal edge portions, as well as upstanding opposite side marginal edge portions and being of a height greater than the effective height of said bight portion above said cowl and a width greater than the distance between said legs, said panel being disposed immediately forward of and in front-to-rear registry with said frame, said upper marginal edge portion being folded rearwardly over and downwardly behind said bight portion and including a free edge portion disposed below said bight portion, said opposite side marginal edge portions being folded rearwardly and inwardly behind said legs and including free edge portions spaced inwardly of said legs, and first means releasably securing said free marginal edge of said upper marginal edge portion to the rear side of said panel upper marginal edge portion below said bight portion and second means releasably securing said free edge portions of said side marginal edge portions to the rear side of said side edge portions marginal inwardly of said legs, said panel including a flexible panel-like transparent insert disposed therein including upper and opposite side margins spaced below and inwardly of said upper and opposite side marginal edge portions and a lower margin spaced appreciably above said lower marginal edge portion, said lower marginal edge portion edgewise overlapping at least an upper marginal portion of said cowl extending between said legs.

2. The recreational vehicle and windbreak and windshield assembly of claim 1, wherein said panel is constructed of canvas and said flexible panel-like transparent insert is constructed of plastic.

3. The recreational vehicle and windbreak and windshield assembly of claim 1, wherein said first and second means include coacting snap fastener elements.

4. The recreational vehicle and windbreak and windshield assembly of claim 1, wherein said upper marginal edge portion includes edgewise outwardly opening notches formed therein through which said support members extend.

5. The recreational vehicle and windbreak and windshield assembly of claim 1, wherein said recreational vehicle comprises a golf cart.

6. The recreational vehicle and windbreak and windshield assembly of claim 1, wherein said panel is constructed of canvas and said flexible panel-like transparent insert is constructed of plastic, said upper marginal edge portion including edgewise outwardly opening notches formed therein through which said support members extend.

7. The recreational vehicle and windbreak and windshield assembly of claim 6, wherein said first and second means include coacting snap fastener elements.

8. The recreational vehicle and windbreak and windshield assembly of claim 7, wherein said recreational vehicle comprises a golf cart.

* * * * *